United States Patent
Marmo et al.

(10) Patent No.: US 8,418,413 B2
(45) Date of Patent: Apr. 16, 2013

(54) WINDTURBINE SUPPORT TOWER WITH PENDULUM-DAMPING MEANS

(75) Inventors: Brett Marmo, Edinburgh (GB); Mark-Paul Buckingham, Edinburgh (GB); Charles Keepax, Edinburgh (GB); John Paul McKeown, Edinburgh (GB); Barry Carruthers, Edinburgh (GB); Donald Black, Edinburgh (GB)

(73) Assignee: XI Engineering Consultants Limited, Edinburgh (GB)

( * ) Notice: Subject to any disclaimer, the term of this patent is extended or adjusted under 35 U.S.C. 154(b) by 304 days.

(21) Appl. No.: 12/675,063

(22) PCT Filed: Aug. 27, 2008

(86) PCT No.: PCT/GB2008/002888
§ 371 (c)(1),
(2), (4) Date: Apr. 15, 2010

(87) PCT Pub. No.: WO2009/027663
PCT Pub. Date: Mar. 5, 2009

(65) Prior Publication Data
US 2011/0056151 A1    Mar. 10, 2011

(51) Int. Cl.
*E04B 1/98*     (2006.01)
(52) U.S. Cl.
USPC .............................. 52/167.4; 52/40; 52/651.01
(58) Field of Classification Search .............. 52/40, 831, 52/651.01, 167.4
See application file for complete search history.

(56) References Cited

U.S. PATENT DOCUMENTS

| | | | |
|---|---|---|---|
| 3,382,629 A | 5/1968 | Reutlinger | |
| 3,605,108 A * | 9/1971 | Crawford | 343/882 |
| 4,406,094 A * | 9/1983 | Hempel et al. | 52/40 |
| 6,672,837 B1 | 1/2004 | Veldkamp et al. | |
| 7,980,814 B2 * | 7/2011 | Nieuwenhuizen | 415/119 |

FOREIGN PATENT DOCUMENTS

| | | |
|---|---|---|
| DE | 10302687 A1 | 7/2004 |
| EP | 0098657 A1 | 1/1984 |
| EP | 1008747 A2 | 6/2000 |
| GB | 2040429 A | 8/1980 |
| WO | WO-98/38392 A1 | 9/1998 |

OTHER PUBLICATIONS

Machine translation of EP1008747.*
Rini, Pietro, "International Search Report", for PCT/GB2008/002888 as mailed Sep. 10, 2009, 5 pages.

* cited by examiner

*Primary Examiner* — Branon Painter
(74) *Attorney, Agent, or Firm* — Snell & Wilmer L.L.P.

(57) ABSTRACT

The present invention relates to a tower (12) configured to support a wind turbine (18, 20). The tower (12) comprises a mass assembly (22) suspended by suspension apparatus (24) from the tower (12) such that the mass assembly (22) is movable to and fro in relation to the tower. The tower (12) also comprises at least one coupling apparatus mechanically coupled to the mass assembly (22) and to the tower (12), the coupling apparatus being operable to couple energy between the mass assembly and the tower as the mass assembly (22) moves to and fro.

19 Claims, 10 Drawing Sheets

WINDTURBINE SUPPORT TOWER WITH PENDULUM-DAMPING MEANS

CROSS-REFERENCE TO RELATED APPLICATIONS

This application is U.S. national phase filing under 35 U.S.C. §371 of PCT/GB2008/002888 filed Aug. 27, 2008 and claims priority from United Kingdom Application No. GB 0716733.1 which was filed on Aug. 30, 2007, both of which are incorporated herein by reference.

FIELD OF THE INVENTION

The present invention relates to a tower for supporting a wind turbine, the tower being configured such that its movement is damped when subject to movement caused, for example, by wind.

BACKGROUND TO THE INVENTION

Exposure to the elements and the movement of wind powered electricity generator blades are liable to cause movement of wind powered electricity generator towers. Such movement can cause the towers to vibrate with undesirable possible consequences. It is known that the vibration can eventually lead to structural failure of wind powered electricity generator towers. Accordingly, it is known to suspend a mass within a wind generator tower to damp the vibration. In use, the suspended mass moves to and fro like a pendulum and in so doing damps the vibration of the tower.

Upon investigating the vibration characteristics of wind generator towers, the present inventors developed an appreciation of the shortcomings of the known approaches to vibration damping.

It is therefore an object for the present invention to provide a tower configured to support a wind turbine, the tower being configured to provide for improved damping of vibration of the tower.

STATEMENT OF INVENTION

The present invention has been devised in the light of the abovementioned appreciation. Thus, according to a first aspect of the present invention there is provided a tower configured to support a wind turbine, the tower comprising: a mass assembly suspended by suspension apparatus from the tower such that the mass assembly is movable to and fro in relation to the tower; and at least one coupling apparatus mechanically coupled to the mass assembly and to the tower, the coupling apparatus being operable to couple energy between the mass assembly and the tower as the mass assembly moves to and fro.

Investigations by the inventors revealed that a tower tends to exhibit many forms of vibration. A first form of vibration is normally termed the first bending mode vibration. A second form of vibration is normally termed the second bending mode vibration. The first and second bending mode vibrations are a primary contributor to vibration in a body, e.g. the ground, on which the tower is supported. In certain circumstances, the second bending mode vibration can be undesirable in particular locations, e.g. in the vicinity of seismic activity monitoring stations. The present inventors have discovered that the above described known damping approach is normally effective at damping the first bending mode vibration but generally less effective at damping the second bending mode vibration. The present inventors have devised a solution to this problem by suspending a mass assembly from the tower and providing at least one coupling apparatus, which is mechanically coupled to the mass assembly and to the tower. In use, the mass assembly moves to and fro and the energy of the mass assembly is coupled between the mass assembly and the tower by the coupling apparatus to thereby attenuate the second bending mode vibration of the tower.

The present inventors have appreciated that the second bending mode vibration may be damped by means of a suspended mass assembly and without at least one coupling apparatus. However, applying this approach in certain towers may necessitate suspending the mass assembly impracticably close to the top of the tower. Use of the at least one coupling apparatus according to the invention can allow the mass assembly to be further spaced apart from the top of the tower than would otherwise be the case.

Thus, more specifically, the tower may be configured such that the mass assembly is spaced apart from a top of the tower.

The tower may be configured such that the at least one coupling apparatus couples to the tower at a location spaced apart from a location at which the suspension apparatus attaches to the tower.

Alternatively or in addition, the mass assembly may be located at least substantially 10% of a length of the tower away from a top of the tower.

More specifically, the mass assembly may be located at least substantially 25% of a length of the tower away from the top of the tower.

More specifically, the mass assembly may be located substantially half way down the tower.

Alternatively or in addition, the mass assembly may be located generally proximate an anti-node of the tower for a particular vibration mode. The particular vibration mode may be the vibration mode that it is desired to attenuate by means of the mass assembly.

More specifically, the tower may be configured such that the mass assembly is suspended substantially mid-way up the tower. The mid-way point has been determined to be an anti-node for the second bending mode in certain towers.

Alternatively or in addition, the tower may comprise a plurality of coupling apparatus spaced apart from each other.

More specifically, the coupling apparatus may be spaced apart from each other around the tower, e.g. around the inside of the tower.

Alternatively or in addition, the coupling apparatus may be disposed such that they lie substantially in a plane orthogonal to a longitudinal axis of the tower.

Alternatively or in addition, the tower may comprise a plurality of coupling apparatus, each apparatus being operative along a respective direction, the directions intersecting each other. More specifically, the tower may comprise at least three coupling apparatus spaced apart substantially equally around the tower. Such a disposition of coupling apparatus can provide for damping in two mutually orthogonal axes. Thus, where the tower is exposed to the wind, damping may be effective irrespective of the wind direction.

More specifically, the tower may comprise six coupling apparatus spaced apart around the tower. Six coupling apparatus have been found to be particularly effective in providing for damping irrespective of wind direction. Increasing the number of coupling apparatus above six may provide for a diminishing rate of improvement in performance.

Alternatively or in addition, the mass assembly may be suspended within the tower.

Alternatively or in addition, the mass assembly may be suspended by at least one elongate member (which constitutes or is comprised in the suspension apparatus).

More specifically, the elongate member may comprise a pliable elongate member, such as a wire cable.

Alternatively or in addition, the mass assembly may be suspended by three elongate members.

More specifically, the three elongate members may be attached to respective locations on the mass assembly, the respective locations being spaced apart from each other on the mass assembly.

More specifically, where the mass assembly is cylindrical in form, the respective locations may be substantially equally spaced apart from each other.

Alternatively or in addition, the coupling apparatus may comprise a biasing device configured to exert a spring bias between the mass assembly and the tower.

More specifically, the biasing device may comprise a spring, such as a helical spring.

Alternatively or in addition, the biasing device may comprise a resilient member. The resilient member might, for example, be formed at least in part of rubber.

Alternatively or in addition, the coupling apparatus may comprise a damping device configured to damp movement of the mass assembly in relation to the tower.

More specifically, the damping device may be a viscous damping device. For example, the viscous damping device may be a miniature shock absorber, such as the MC150, from ACE Controls International, Newton-le-Willows, UK. Alternatively or in addition, the damping device may be a rubber buffer. For example, the damping device may be a 34-14 TA Tubus Damper from Ace Controls International, Newton-le-Willows, UK.

Alternatively or in addition, the coupling apparatus may be attached to at least one of: the mass assembly; and a surface of the tower. The coupling apparatus may be attached by at least one of: a threaded coupling; and a weld.

In certain embodiments, the coupling apparatus may be configured to exert a bias between the tower and the mass assembly and to damp movement of the mass assembly and the tower in relation to each other.

More specifically, the coupling apparatus may be formed of a resilient material, such as rubber, the resilient material having a predetermined spring constant and a predetermined damping coefficient.

According to an embodiment, the tower may comprise a support assembly rigidly attached to an inside of the tower, e.g. at the mid tower flange, the support assembly being mechanically coupled to the mass assembly via the at least one coupling apparatus.

More specifically, the support assembly may be disposed in the tower below the mass assembly.

Alternatively or in addition, the support assembly may have a triangular footprint when viewed from below in the tower.

Alternatively or in addition, the support assembly may comprise a frame and a platform supported on the frame. The platform can be used for installation and maintenance operations.

Alternatively or in addition, the support assembly may be configured to provide for a change in a spring constant of the support assembly.

More specifically, the support assembly may comprise at least one tensioning device operative to change a tension between spaced apart locations on the support assembly.

More specifically, the tensioning device may be operative to change a tension between a first location towards a top and a first side of the support assembly and a second location towards a bottom and a second, opposing side of the support assembly.

Alternatively or in addition, the support assembly may comprise a plurality of tensioning devices, each operative to change a tension along a respective direction, the directions intersecting each other.

Alternatively or in addition, the tensioning device may comprise a pliable member, such as a wire cable, and a length adjusting device operative to adjust a length of the pliable member.

Alternatively or in addition, the coupling apparatus may comprise a plurality of biasing devices each operative in a respective direction, the directions intersecting each other.

More specifically, the coupling apparatus may comprise first and second biasing devices, which are operative in first and second opposing directions, and third and fourth biasing devices, which are operative in third and fourth opposing directions, the first and second opposing directions being substantially orthogonal to the third and fourth opposing directions.

Alternatively or in addition, the coupling apparatus may comprise a plurality of damping devices each operative in a respective direction, the directions intersecting each other.

More specifically, the coupling apparatus may comprise first and second damping devices, which are operative in first and second opposing directions, and third and fourth damping devices, which are operative in third and fourth opposing directions, the first and second opposing directions being substantially orthogonal to the third and fourth opposing directions.

Alternatively or in addition, a first end of the coupling apparatus may be mounted on a first member extending from the support assembly in a longitudinal direction along the tower and a second, opposite end of the coupling apparatus may be mounted on a second member extending from the mass assembly in a longitudinal direction along the tower.

Alternatively or in addition, the mass assembly may comprise a mass support structure defining a bore and having a triangular footprint.

According to another embodiment, the mass assembly may comprise a mass support structure configured to fit inside the tower, the mass support structure defining a bore.

More specifically, the mass support structure may comprise one of: an annular structure; and a triangular structure having a triangular footprint when viewed from below in the tower.

More specifically, the annular structure may be configured to be a snug fit inside the tower.

More specifically, an outer surface of the annular structure may be spaced apart from an inner surface of the tower by about 100 mm.

Alternatively or in addition, the annular structure may have a tubular footprint when in use and viewed from below.

Alternatively or in addition, the mass assembly may comprise a plurality of mass members, e.g. formed of concrete, spaced apart around the mass assembly.

Alternatively or in addition, the mass assembly may comprise at least one retaining member supporting the plurality of mass members.

More specifically, the mass assembly may comprise a first and a second retaining member, the first retaining member being disposed such that, in use, the plurality of mass members rest upon the first retaining member, and the second retaining member resting upon the plurality of mass members.

Alternatively or in addition, the at least one retaining member may be of generally annular form.

More specifically, the at least one retaining member may define an aperture at least in part towards an outer edge of the retaining member, the aperture being of a size such that a person is able to pass through the aperture, for example, between an inside surface of the tower and the outer surface of the mass assembly. Thus, access may be gained to upper reaches of the tower beyond the mass assembly, e.g. for maintenance purposes.

Alternatively or in addition, the coupling apparatus may extend from a surface of the mass assembly opposing a surface of the tower.

Alternatively or in addition, the coupling apparatus may be disposed towards a ground most end of the mass assembly.

According to a yet further embodiment, the mass assembly may comprise a cylindrical structure and a plurality of spaced apart spacer members extending radially from an outer surface of the cylindrical structure.

More specifically, the spacer members may be of a size and the cylindrical structure of a size such that a person is able to pass between the inside surface of the tower and the outer surface of the cylindrical structure and between adjacent spaced apart spacer members. Thus, access may be gained to upper reaches of the tower beyond the mass assembly, e.g. for maintenance purposes.

Alternatively or in addition, the at least one coupling apparatus may be disposed towards a distal end of a respective spacer member. Alternatively or in addition, the tower may be configured to be ground supported. Alternatively or in addition, the tower may be freestanding. Alternatively or in addition, the tower may be of substantially cylindrical form. Alternatively or in addition, the tower may be of tubular form along a substantial part of its length.

The tower may be configured such that a damping characteristic of the mass assembly may be changed by changing a spring component of the tower. More specifically, the tower may be configured such that the damping characteristic may be changed without changing a mass of the mass assembly.

According to a second aspect of the present invention, there is provided a wind turbine apparatus comprising a tower according to the first aspect of the present invention.

Embodiments of the second aspect may comprise one or more features of the first aspect of the invention.

According to a further aspect of the present invention there is provided a tower of substantially cylindrical form, which extends up from the ground, the tower comprising: a mass assembly suspended by suspension apparatus from the tower such that the mass assembly is movable to and fro in relation to the tower; and at least one coupling apparatus mechanically coupled to the mass assembly and to the tower, the coupling apparatus being operable to couple energy from the mass assembly to the tower as the mass assembly moves to and fro.

Embodiments of the further aspect of the present invention may comprise one or more features of any previous aspect of the present invention.

BRIEF DESCRIPTION OF THE DRAWINGS

Embodiments of the present invention will be described by example only and with reference to the accompanying drawings, in which.

SPECIFIC DESCRIPTION

Figures 1A, 1B:
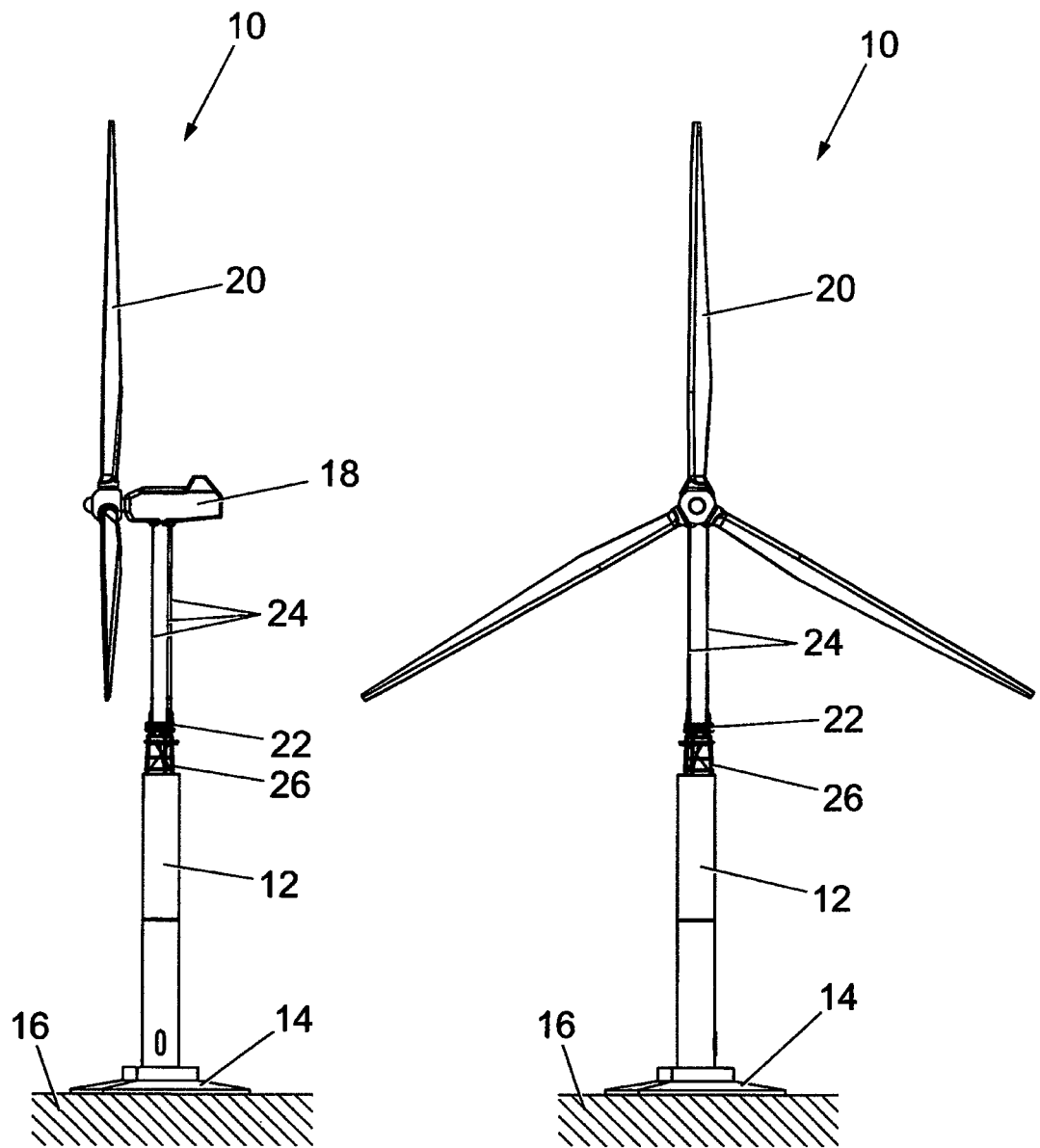
FIGS. 1A and 1B show a side view and a front view respectively of a wind generator comprising the present invention.

Side and front views of a wind powered electricity generator 10 (which constitutes a wind turbine) are shown in FIGS. 1A and 1B respectively. The wind generator 10 comprises a tower 12 that is supported by means of a base 14 on the ground 16. The tower 12 supports a nacelle 18 at its distal end. The nacelle 18 houses a drive shaft, gear box, generator, yaw system and supporting brake and hydraulic apparatus. The rotor 20 (comprising the blades) of the wind generator connects to the hub (not shown) by means of the drive shaft. In this embodiment, the combined weight of the rotor 20, the hub and the nacelle 18 and its components is about 140 tons. The tower 12 is 60 m high and has a weight of 109 tons. The rotor 20 has a span of 80 m such that rotation of the rotor covers an area of 5026 $m^2$. The base 14, which is formed of concrete, is 15 m square and 3 m high. At least part of the base may, depending on the configuration, extend below ground level. FIGS. 1A and 1B also show components of an embodiment of the present invention; the components are shown in more detail in further drawings and are described in more detail below. The components of the embodiment comprise a mass assembly 22, which is suspended inside the tower 12 from the nacelle 18 by means of three wire cables 24. A support assembly 26 is attached to the inside the tower 12 at the mid tower flange (not shown). The support assembly 26 and the mass assembly 22 are mechanically coupled by three coupling apparatus (not shown) as is described below in detail with reference to FIGS. 8 to 10. The upper half of the tower 12 as shown in FIGS. 1A and 1B is absent so as to provide a view of the components of the embodiment; in practice the tower extends from the mid tower flange up to the nacelle 18.

Figure 2:
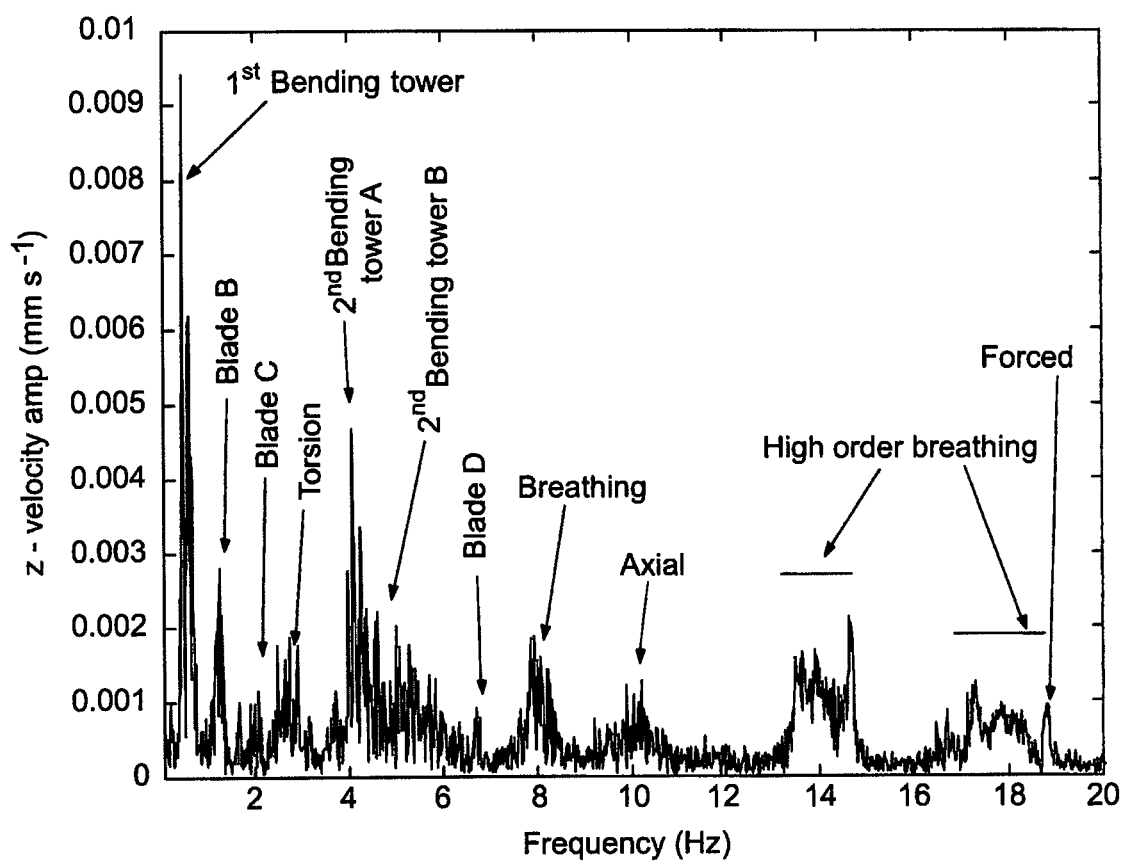
FIG. 2 shows frequency spectra of vertical vibration of the wind generator of FIG. 1.

FIG. 2 shows frequency spectra of vertical vibration of the wind generator 10 shown in FIG. 1. The frequency spectra were measured using Syscom MS2003 triaxial geophones placed at the base 14, on a flange at 30.4 m above the base and in the nacelle 18. Measurements made by the geophones were recorded by synchronously operated data loggers. During the measurement period the average wind speed was 4.8 $ms^{-1}$. As can be seen from FIG. 2, a large peak at 0.5 Hz corresponds to the first bending mode of the tower 12. A broad peak between 4 and 5 Hz corresponds to the second bending mode of the tower. As discussed above the second bending mode can cause undesirable ground vibration. The broad peak comprises subsidiary peaks at 4.07 Hz and 4.61 Hz. It is understood that the presence of the two subsidiary peaks is on account of the axial asymmetry of the nacelle 18. More specifically, the mass of the nacelle 18 is elongate in a direction perpendicular to the longitudinal axis of the tower 12. The first subsidiary peak at 4.07 Hz corresponds to bending mode vibration along the length of the nacelle. The second subsidiary peak at 4.61 Hz, which is smaller than the first subsidiary peak, corresponds to bending mode vibration across the width of the nacelle. The anti-nodes of the second bending mode for both the first and the second subsidiary peaks are 35 m above the base 14.

The table below shows the amplitude of vibration at 4.1 Hz when measured at the flange at 30.4 m above the base.

TABLE

Measured vibration at 30.4 m at 4.1 Hz in rms for wind speeds of 4.8 ms$^{-1}$

| Axis | Displacement (mm) | Velocity (mm s$^{-1}$) | Acceleration (mm s$^{-2}$) |
|---|---|---|---|
| X | 0.0134 | 0.3802 | 10.7499 |
| Y | 0.0225 | 0.6363 | 17.9910 |
| Z | 0.0016 | 0.0272 | 0.4631 |

As can be seen from the table above, the greatest displacement was 0.0225 mm rms, which is equivalent to 0.0663 mm peak to peak.

The wind generator of this embodiment (a Nordex N80 wind turbine) is rated for operation up to wind speeds of 25 ms$^{-1}$. Given that aerodynamic drag increases with the square of wind speed, the force on the wind generator at the highest operational wind speed is about thirty times greater than the forces reflected in the figures in the above table. An estimate of amplitudes that can be expected at a wind speed of 25 ms$^{-1}$ is given in the table below.

TABLE

Estimated vibration amplitude at 30.4 m at 4.1 Hz for a wind speed of 25 ms$^{-1}$

| Estimate for 25 ms$^{-1}$ Axis | Displacement (mm) | Velocity (mm$^{-1}$) | Acceleration (mm s$^{-2}$) |
|---|---|---|---|
| X | 0.67 | 19.08 | 539.73 |

Hence, the peak to peak amplitude of the second bending mode vibration is about 1.8 mm when the wind generator is operated at of 25 ms$^{-1}$.

Figure 3:
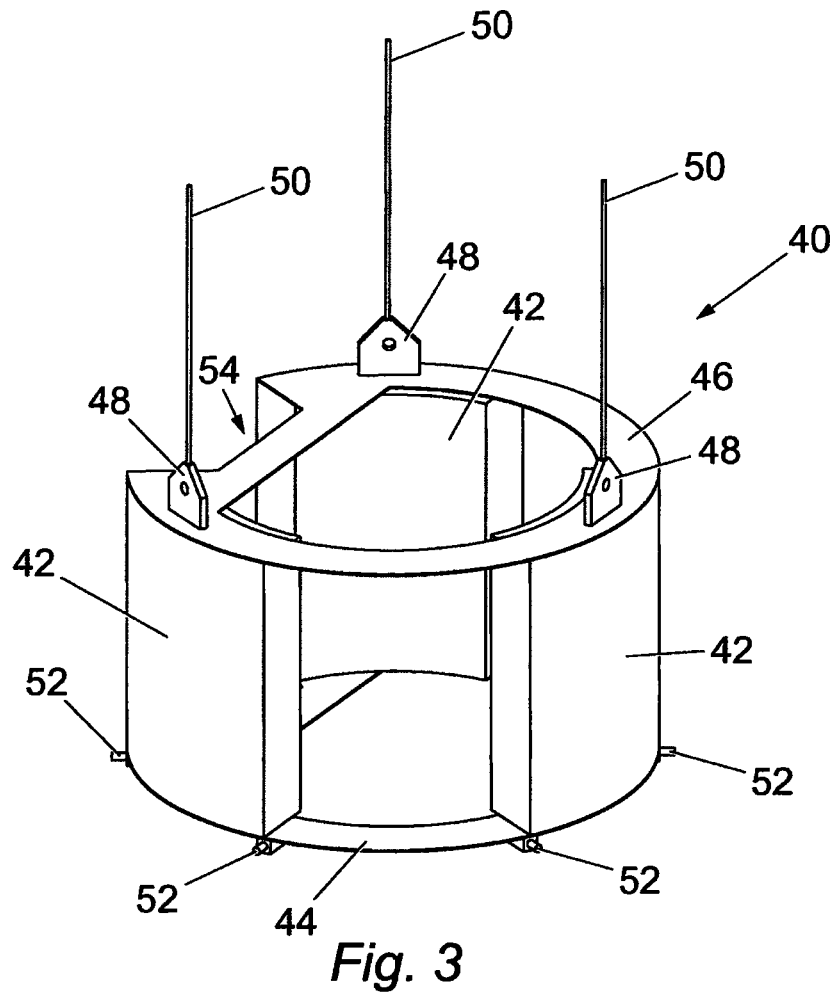
FIG. 3 shows a first embodiment of mass assembly according to the invention.

FIG. 3 shows a mass assembly 40 according to a first embodiment of the present invention. The mass assembly 40 is of generally annular form such that it has a tubular footprint when viewed from above or below. The mass assembly 40 comprises three mass members 42 formed of concrete. Each mass member, in use, extends in the same direction as the longitudinal axis of the tower 12. Adjacent mass members 42 are spaced apart substantially equally from each other such that, in use, they extend around the inner surface of the tower 12. The mass members 42 rest on and are connected to a first retaining member 44. A second retaining member 46 rests on and is connected to the mass members 42. Three lugs 48 are connected to an upper surface of the second retaining member 46. Each lug 48 defines an aperture through which a length of wire cable 50 is received to secure the length of wire cable to the mass assembly 40. The opposite ends (not shown) of the lengths of wire cable 50 are connected towards an upper end of the inside of the tower 12 of FIG. 1 such that the mass assembly is suspended inside the tower. Six coupling apparatus 52 are attached to an underside of the first retaining member 44 such that each coupling apparatus extends beyond an outer edge of the first retaining member 44. The second retaining member 46 is shaped such that it defines along with the inside surface of the tower an aperture 54 of sufficient size and dimensions to allow a person to pass.

Figure 4:
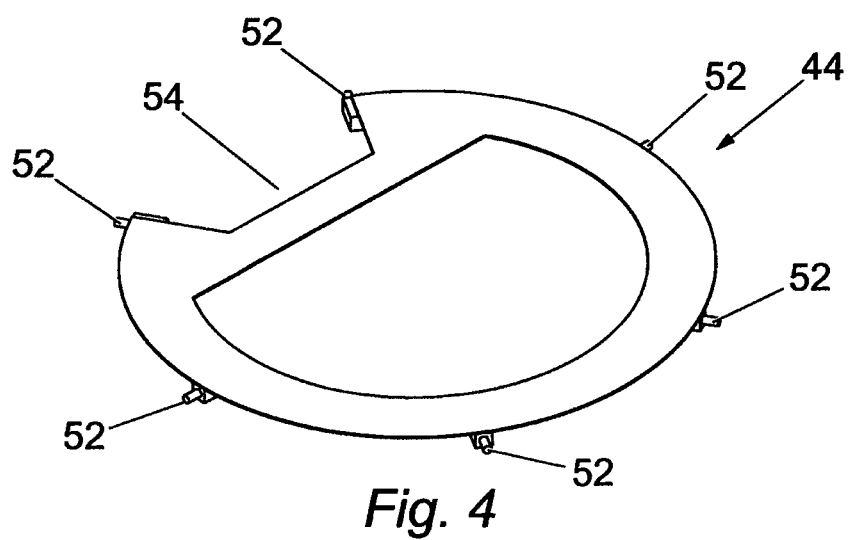
FIG. 4 provides a perspective view of part of the mass assembly shown in FIG. 3.

FIG. 4 shows the first retaining member 44 in more detail. As can be seen from FIG. 4, the coupling apparatus 52 are spaced apart from each other around the retaining member 44 such that adjacent coupling apparatus are equally spaced apart from each other. The coupling apparatus comprises a spring, such as a helical spring, and a viscous damping device. The damping device reduces the likelihood of the mass assembly hitting the inside surface of the tower. The characteristics of the spring and the damping device are described in more detail below. In another form, the coupling apparatus comprises a resilient material, which is operative to provide both a spring bias and damping in accordance with the characteristics described below. The design of such a resilient material is a routine matter involving well known design techniques that are familiar to the skilled person.

Figure 5:
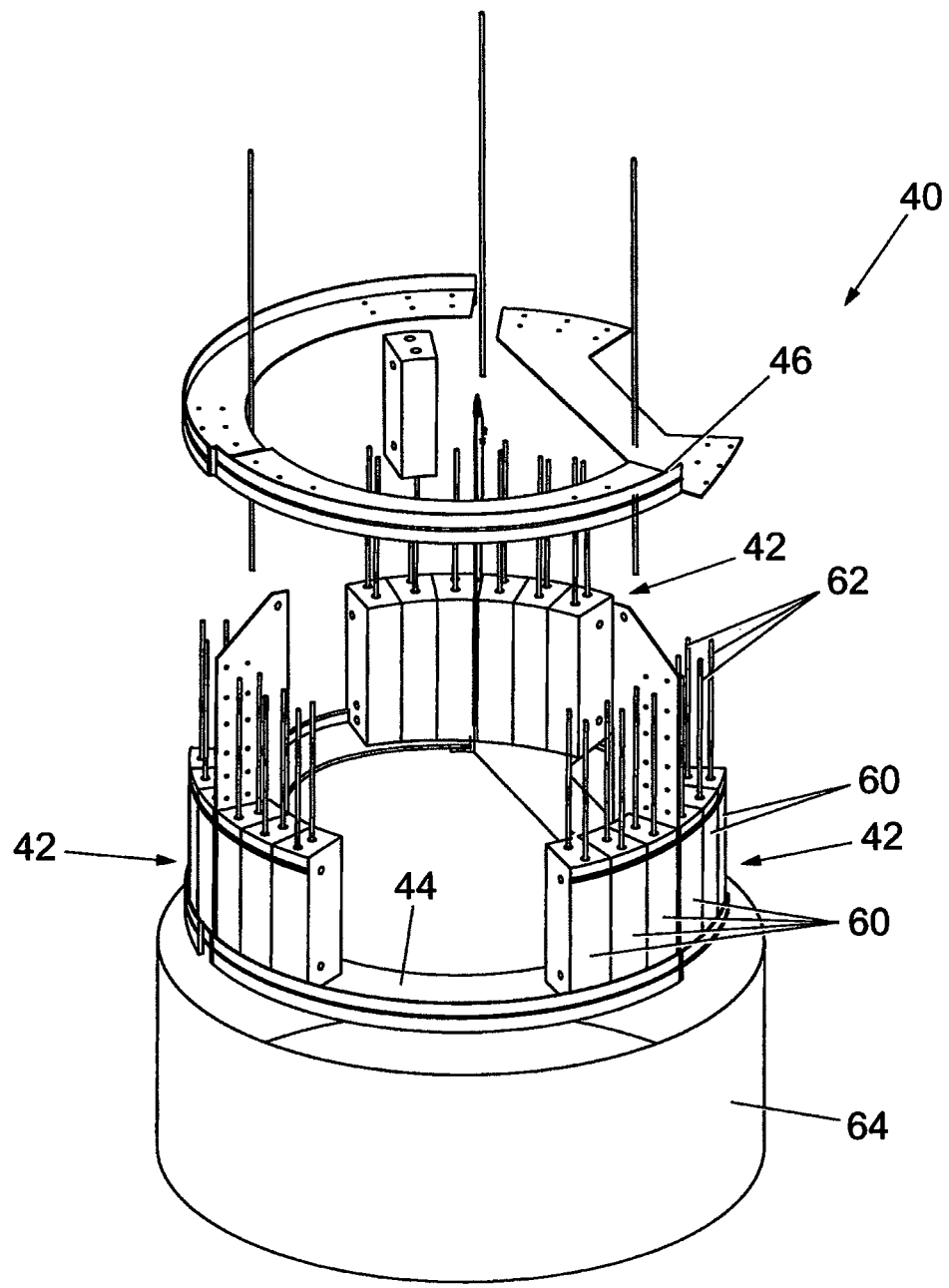
FIG. 5 provides an exploded view of the mass assembly shown in FIG. 3.

FIG. 5 is an exploded view of the mass assembly 40 of FIG. 3. Components in common with FIGS. 3 and 4 are designated by common reference numerals. As can be seen, each mass member 42 comprises a number of concrete blocks 60. The concrete blocks are connected to the first and second retaining members 44, 46 by steel rods 62 that extend through apertures formed in the concrete blocks. The ends of the steel rods 62 are attached to the first and second retaining members 44, 46. As shown in FIG. 5, the mass assembly 40 can comprise at least one further assembly 64 comprising mass members 42 and retaining members 44, 46, with the assemblies connected end to end. Thus, a weight of the mass assembly 40 can be changed. The mass assembly shown in FIG. 3 has a weight of about 5 tons and the double mass assembly shown in FIG. 5 has a weight of about 10 tons.

Figure 6:
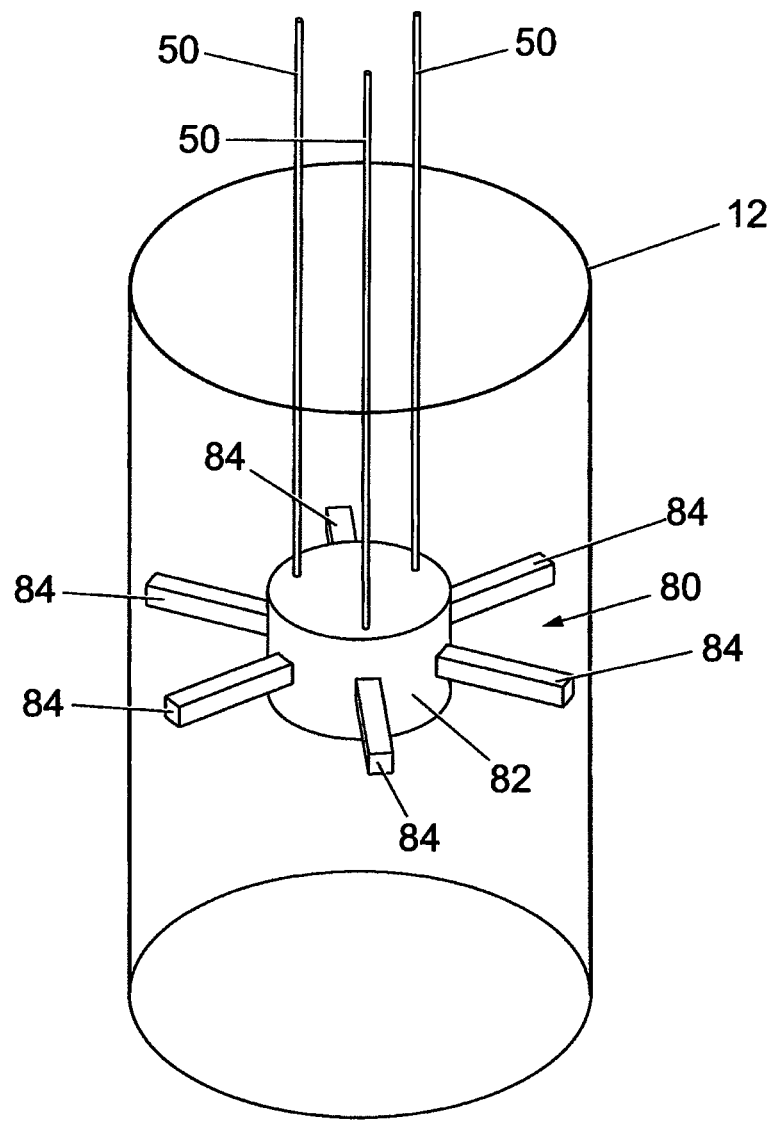
FIG. 6 shows a second embodiment of mass assembly according to the invention.

A second embodiment of mass assembly 80 is shown in FIG. 6. The mass assembly 80 is of the same form and function as the mass assembly of FIGS. 3 to 5 except as now described. The mass assembly 80 comprises a cylindrical body 82. Six elongate spacer members 84 extend radially from an outer surface of the cylindrical body 82. Adjacent spacer members 84 are spaced equally apart from each other. The spacer members 84 and the cylindrical body 82 are of dimensions and are disposed in relation to each other such that a person can pass between adjacent spacer members 84, the cylindrical body 82 and the inner surface of the tower 12 when the mass assembly is in use. A coupling apparatus (not shown) as described above is attached to the distal end of each spacer member. The spacer members 84 and the cylindrical body 82 are formed of appropriate materials, such concrete and metal, in accordance with well known design and construction principles and practice. As described above for the first embodiment, the mass assembly 80 of the second embodiment is suspended from the tower 12 by means of three wire cables 50.

The operation of the first and second embodiments will now be described. As described above the mass assembly 40, 80 is suspended by means of the wire cables inside the tower 12. The wire cables constrain but do not resist movement of the mass assembly to and fro within the tower. The mass assembly 40, 80 is suspended such that the coupling apparatus are disposed in the tower 12 at about 35 m above the base 14. The mass assembly is used to damp the second bending mode peaks at 4.07 Hz and 4.61 Hz. This is possible because both mode peaks share an anti-node. Also, the damping coefficient of the damping device of each coupling apparatus is increased to reduce the q-factor of the mass assembly to make it less effective at attenuating a single frequency whilst increasing the bandwidth over which vibration attenuation occurs.

The performance of the present invention was assessed using finite element computer modelling and the spring and damping characteristics were developed as will now be described. The springs of the coupling apparatus were modelled as rods having a cross-sectional area of 0.01 m² and their Young's modulus varied to change the spring constant. The Young's modulus was determined by selecting a global spring constant K for the mass assembly 40, 80 and a target frequency f based on simple harmonic motion of a spring system:

$$K = 4\pi^2 f^2 m$$

The global spring constant is considered as the spring constant when all six radial springs act in parallel. For the radial geometry used where all springs are the same initial length L and the movement of the tuned mass relative to the tower wall Δx is small, the spring constants of individual springs k is related to the global spring constant by:

$$k = \frac{K\Delta x}{2\Delta x + \left(\frac{4L - 4C\sqrt{M}}{\sqrt{M}}\right)},$$

where $$C = L\cos\alpha - \Delta x$$

$$M = 1 + \frac{L^2 \sin^2\alpha}{C^2}$$

and α is the radial angle between individual springs (60°). The equation is insensitive to changes in Δx when Δx<L.

The Young's modulus for each spring is then calculated as:

$$E = \frac{kL}{A}$$

where A is the cross section area of the rod used to model the springs.

Use of the mass assembly 40, 80 such that the coupling apparatus operate at the anti-node increases the modal mass of the second bending mode and reduces the resonant frequency of the bending mode. The change in frequency of the 4.07 Hz and 4.61 Hz peaks of the second bending mode related to different sized mass assemblies 40, 80 is shown in the table below.

TABLE

Change in resonant frequency related to mass assembly weight

|  | 2$^{nd}$ Bending Mode A | 2$^{nd}$ Bending Mode B |
| --- | --- | --- |
| Without the invention | 4.07 | 4.61 |
| 5 ton mass | 3.92 | 4.29 |
| 10 ton mass | 3.77 | 4.10 |

Figure 7:
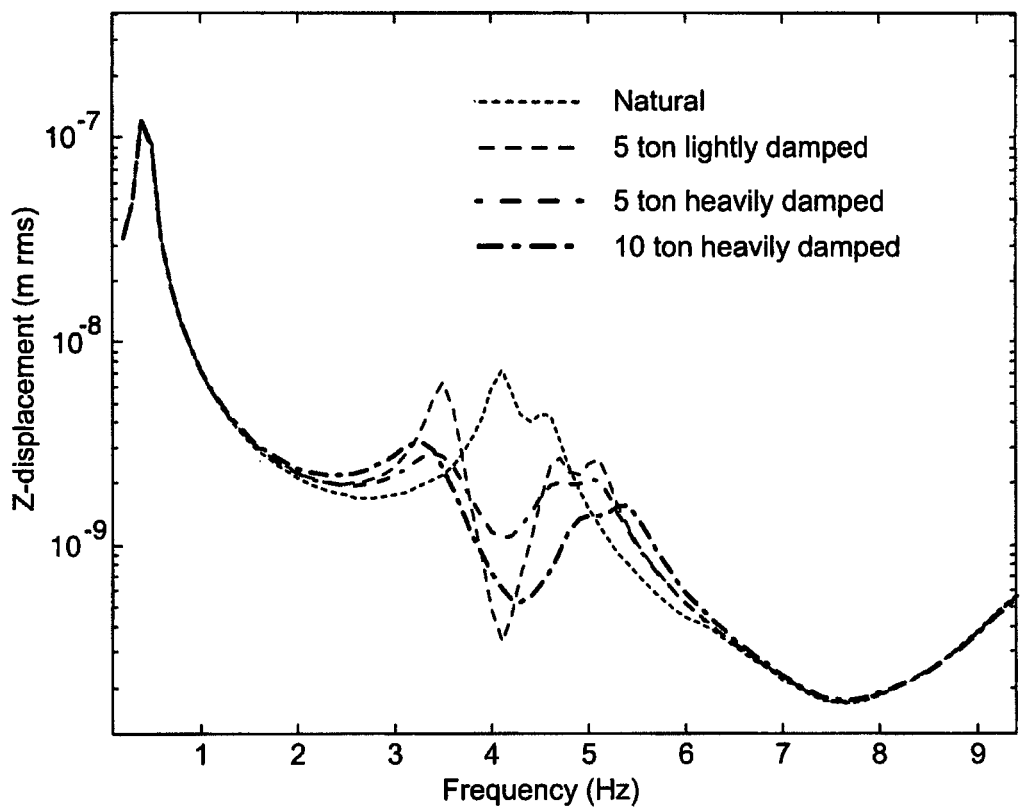
FIG. 7 shows frequency spectra for tower vibration at different levels of damping according to the invention.

As noted above, the dampers of the coupling apparatus reduce the q-factor of the mass assembly 40, 80. An increase in damping reduces attenuation at the target frequency but increases the frequency bandwidth over which the mass assembly 40, 80 is effective. The reduction of the q-factor also reduces the amplitude of the two new resonances either side of the target frequency. This behaviour is illustrated in FIG. 7, which shows displacement against frequency over the range of 0 to 9 Hz for an un-damped tower and a tower damped with: a lightly damped 5 ton mass assembly; a heavily damped 5 ton mass assembly; and a heavily damped 10 ton mass assembly. The Raleigh Damping coefficients that provide □ for optimal attenuation over the 4-5 Hz range are $_{dM}$□=5 and $_{dK}$=0.1. This provides an effective q-factor of 0.722 at 4.1 Hz.

The reduction in ground vibration for a variety of masses and Raleigh damping coefficients is shown in the table below. In the table z is vertically upward from the ground and x is parallel to the wind direction. Attenuation increases with the weight of the mass assembly 40, 80.

| Mass |  |  | q at | Attenuation Ratio |  |  |  |
| --- | --- | --- | --- | --- | --- | --- | --- |
| (kg) | α$_{dM}$ | α$_{dK}$ | 4.1 Hz | x | y | z | Mean |
| 1015 | 1 | 0.05 | 1.507 | 0.5920 | 0.7350 | 0.6935 | 0.6735 |
| 2030 | 1 | 0.05 | 1.507 | 0.461 | 0.6281 | 0.5493 | 0.5461 |
| 5045 | 1 | 0.05 | 1.507 | 0.3785 | 0.388 | 0.3957 | 0.3874 |
| 5045 | 5 | 0.1 | 0.722 | 0.3145 | 0.3733 | 0.3748 | 0.3542 |
| 10090 | 5 | 0.1 | 0.722 | 0.1673 | 0.1571 | 0.2003 | 0.1749 |

Table: Attenuation for different damping characteristics in the 4-5 Hz frequency range. The attenuation ratio is taken as the ground vibration produced by a modified generator compared to that of an unmodified generator.

Key parameters for a 5 ton and a 10 ton mass according to the invention are provided in the table below:

| Weight of mass |  | 5 ton | 10 ton |
| --- | --- | --- | --- |
| Second bending A frequency | Hz | 3.92 | 3.77 |
| Second bending B frequency | Hz | 4.29 | 4.1 |
| Target frequency | Hz | 4 | 3.8 |
| Global spring constant K | Nm-1 | 3.16E+06 | 6.32E+06 |
| Individual springs k | Nm-1 | 1.05E+06 | 2.11E+06 |
| α$_{dM}$ |  | 5 | 5 |
| α$_{DK}$ |  | 0.1 | 0.1 |
| Height of coupling above base | m | 35 | 35 |
| Modelled attenuation (4-5 Hz) |  | 0.35 | 0.18 |

Figure 8:
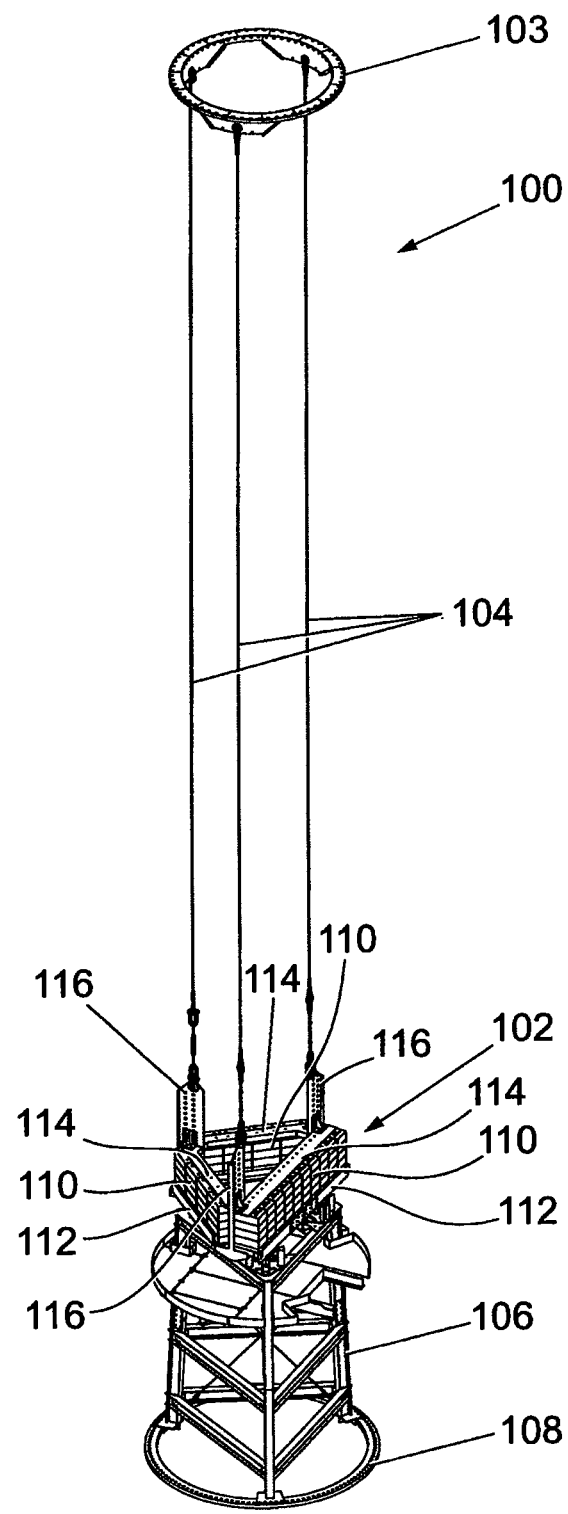
FIG. 8 shows a third embodiment of mass assembly according to the invention.

A third embodiment 100 of the invention is shown in FIG. 8. The embodiment 100 comprises a mass assembly 102, which is suspended from a flange 103 at the top of the tower (not shown) by means of three spaced apart wire cables 104. The embodiment also comprises a support assembly 106, which is rigidly attached to the mid tower flange 108; the support assembly is described more fully below with reference to FIG. 9. As mentioned above with reference to FIGS. 1A and 1B the support assembly 106 and the mass assembly 102 are mechanically coupled by three coupling apparatus (not shown).

As can be appreciated from FIG. 9, the mass assembly 102 has a triangular footprint when viewed from above or below in the tower. The mass assembly 102 comprises three mass members 110 formed of concrete, with each mass member forming a respective side of the triangular mass assembly. Each mass member, when in use, extends in the same direction as the longitudinal axis of the tower. Each mass member 110 rests on and is connected to a first retaining member 112. A second retaining member 114 rests on and is connected to each mass member 110. Each mass member 110 comprises a number of concrete blocks. The concrete blocks are connected to the first and second retaining members 112, 114 by steel rods that extend through apertures formed in the concrete blocks. The ends of the steel rods are attached to the first and second retaining members 112, 114. Three lugs 116 are connected to an upper surface of the second retaining members 114. Each lug 116 defines an aperture through which an end of the wire cable 104 is received to secure the wire cable to the mass assembly 102.

Figure 9:
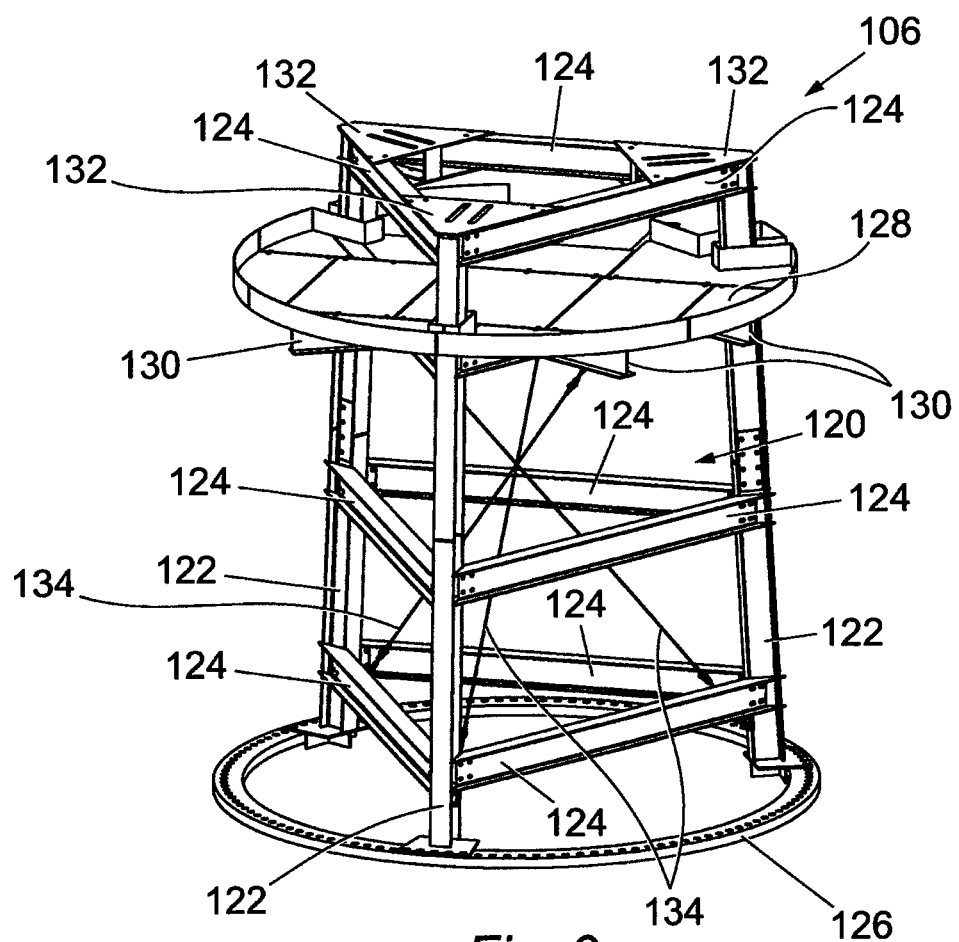
FIG. 9 shows a support assembly of the third embodiment.

The support assembly 106 is shown in more detail in FIG. 9. The support assembly comprises a frame 120 formed of elongate sections of an appropriate material, such as steel. The frame 120 comprises three longitudinal lengths of material 122 which are spaced apart from each other and extend in a generally longitudinal direction vis-à-vis the tower.

The frame also comprises three sets of three spaced apart lengths of material 124, with each set connecting adjacent longitudinal lengths of material. The lower ends of the longitudinal lengths of material 122 are connected to the mid tower flange 126. The support assembly 106 also comprises a platform 128, which is configured to provide a safe area from which installation and maintenance operations can be carried out. The platform 128 is supported on an arrangement of intersecting lateral supports 130, which are connected to the frame 120. A mounting plate 132 is attached to the frame 120 at the top end of each longitudinal length of material 122. A coupling apparatus is connected to each mounting plate 132 as is described below.

As can be seen from FIG. 9, the support assembly 106 comprises three tensioning devices 134. Each tensioning device 134 comprises wire cable, which is attached at one end towards the lower end of a longitudinal length of material 122 and is attached at the other, opposing end to a lateral support 130 such that the cable extends generally from one side of the frame to the other side of the frame. The three tensioning devices 134 are configured such that their cables intersect in the centre of the frame. A tension of the cable of each tensioning device is changed by two length adjusting devices. Each length adjusting device comprises a screw threaded arrangement or the like, which is operative to change the effective length of a cable. As is described below, the tensioning devices are operative to change a spring constant of the support assembly 106.

Figure 10:
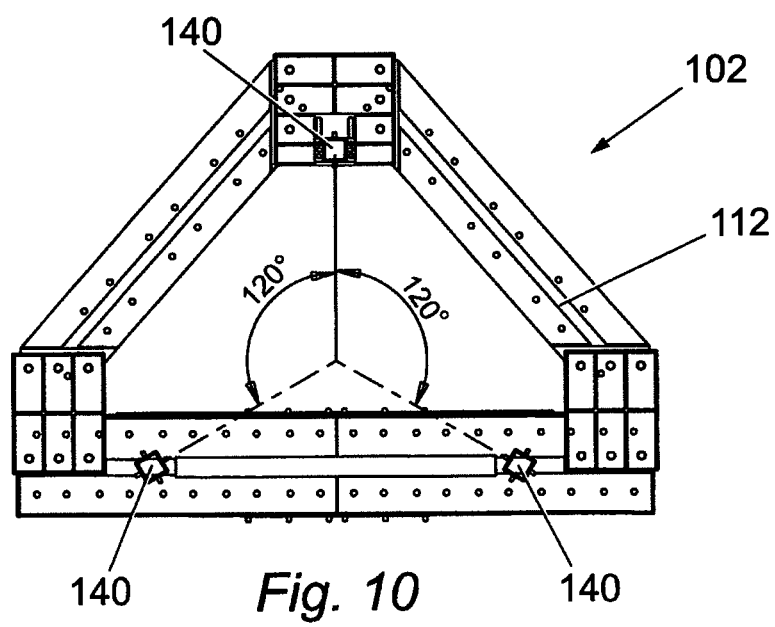
FIG. 10 provides an underside view of a mass assembly of the third embodiment.

FIG. 10 provides an underside view of the mass assembly 102 of the third embodiment shown in FIG. 8. As can be seen from FIG. 10, three coupling apparatus 140 are mounted at spaced apart locations on the underside of the first retaining member 112, such that the three coupling apparatus 140 describe the points of a triangle.

Figure 11:
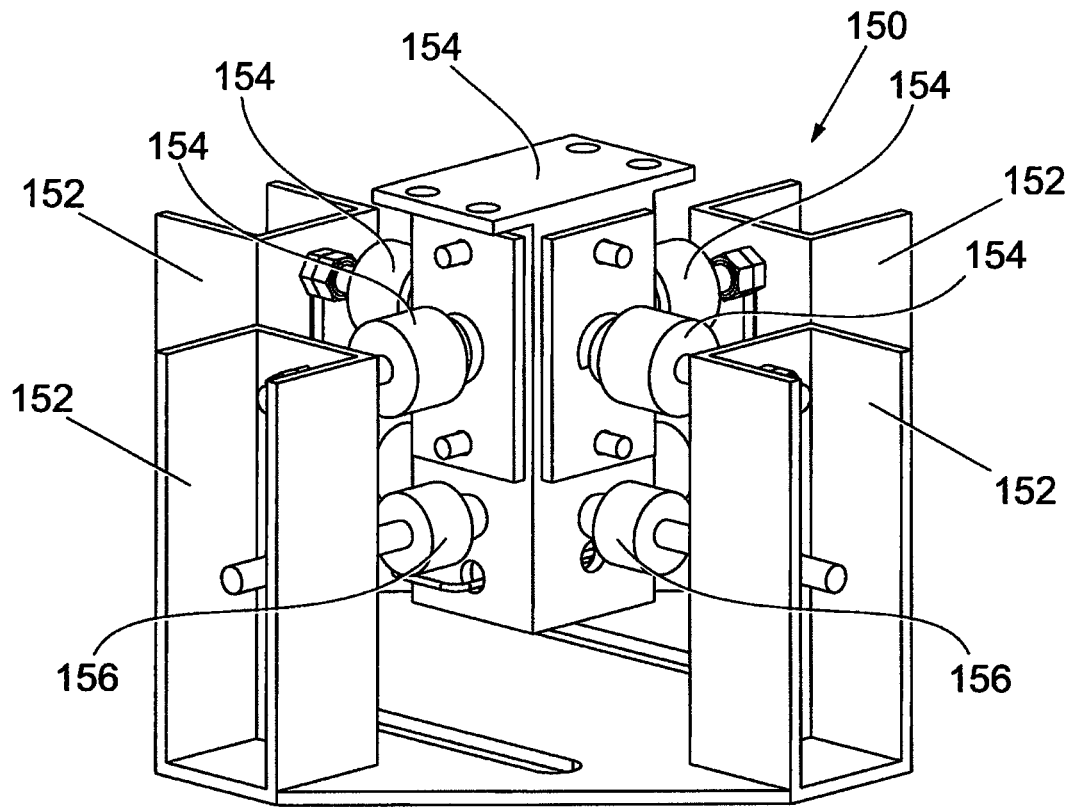
FIG. 11 shows a coupling apparatus of the third embodiment.

A coupling apparatus 150 is shown in FIG. 11. The coupling apparatus comprises four spaced apart support members 152, which are attached to and extend upwardly from a mounting plate 132 (not shown) on the support assembly 106 (not shown). The coupling apparatus also comprises a mass member 154, which is attached to and extends downwardly from the first retaining member 112 (not shown) on the mass assembly 102 (not shown). The mass member is of square cross-section. The coupling apparatus 150 further comprises four springs 154, such as a helical spring (each of which constitutes a biasing device). One end of each spring 154 is attached to a respective face of the mass member 154. The other, opposing end of each spring 154 is attached to a face of a respective support member 152. The coupling apparatus 150 also comprises four damping devices 156, such as the Tubus TA34-14, from ACE Controls International, Newton-le-Willows, UK. One end of each damping device 156 is attached to a respective face of the mass member 154. The other, opposing end of each damping device 156 is attached to a face of a respective support member 152. The springs 154 are disposed closer to the mass assembly 102 than the damping devices 156. Referring to FIG. 10, it can be appreciated that there are in all six pairs of opposing springs and six pairs of opposing dampers, with a radial angle of 60° between each pair.

As can be appreciated from FIGS. 8 to 10 and the accompanying description, the mass assembly 102 and the'support assembly 106 is assembled from parts of a width that allows for their passage through a small aperture, such as an access door at the foot of a tower 12. Thus the parts can be passed through the door and the mass assembly 102 and the support assembly 106 assembled at the foot of the tower 12 before being hoisted to the desired position in the tower.

Figure 12:
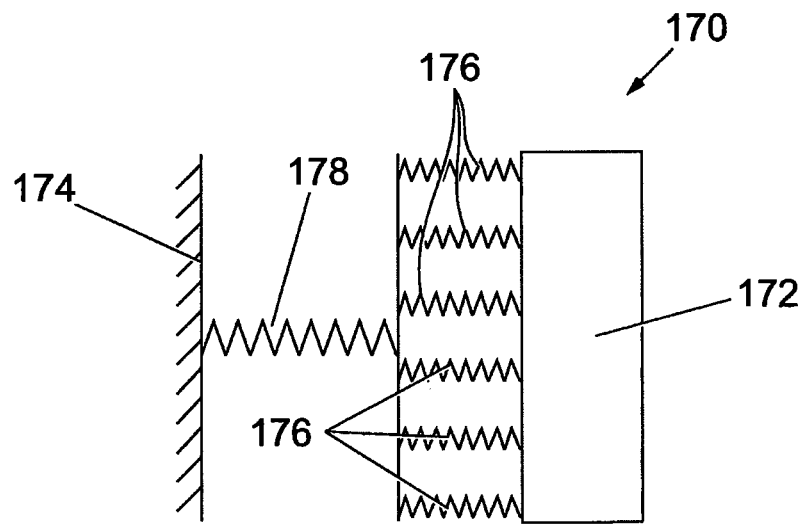
FIG. 12 is model of the spring constant of the third embodiment.

A model 170 of the spring constant of the third embodiment is provided in FIG. 12. The mass assembly is represented by reference numeral 172 and the tower is represented by reference numeral 174. The spring constants 176 of the springs and the damping devices of the coupling apparatus operate in parallel to each other providing a combined spring constant for the springs and damping devices. The spring constant of the support assembly 178 operates in series with the combined spring constant for the springs and damping devices to provide an overall spring constant for the embodiment. The combination of the individual spring constants 176 for the springs and damping devices and the spring constant 178 for the support assembly is represented in FIG. 12.

In use, the embodiment is tuned to a target frequency f by selecting an overall spring constant K for a given mass m of the mass assembly:

$$K = 4\pi^2 f^2 m$$

As mentioned above, the overall spring constant is the combination of spring constants of the springs and the spring constant of the support assembly acting. As can be appreciated from FIG. 10, there are six sets of springs and dampers arranged at 60° to each other, with each set consisting of two springs and two damping devices. The combined spring constant $K_{SD}$ of the springs and damping devices for any horizontal movement of the mass assembly is the sum of the spring constants for the springs $K_S$ and the damping devices $K_D$ with an adjustment made for their radial arrangement:

$$K_{SD} \approx 4(2K_s + 2K_D)$$

The springs and damping devices provide a crude, initial spring constant for the embodiment. The spring constant of the support assembly is modified by changing the tension of the cables of the tensioning devices 134 to provide for fine adjustment of the overall spring constant and thereby tune the embodiment to the target frequency. The tensions in the cables are adjusted until the spring constant of the support assembly $K_{SA}$ is given by:

$$K_{SA} = \frac{K_{SD} \cdot K}{K_{SD} - K}$$

Thus, in a working embodiment, for a mass of 5700 kg that is to be tuned to 4.3 Hz, the required global spring constant is 4.1607E7 N/m. If springs with a spring constant of 3.20E6 N/m and dampers with a spring constant of 6.36E6 N/m are used, their combined spring constant is $K_{SD}$=7.648E6 N/m. To tune the device correctly to 4.3 Hz the spring constant of the support assembly is adjusted by means of the support assembly to 9.125E6 N/m. According to such an embodiment, the period of the mass assembly is substantially 10 seconds and the period of the coupling apparatus is substantially 0.25 seconds.

Figure 13:
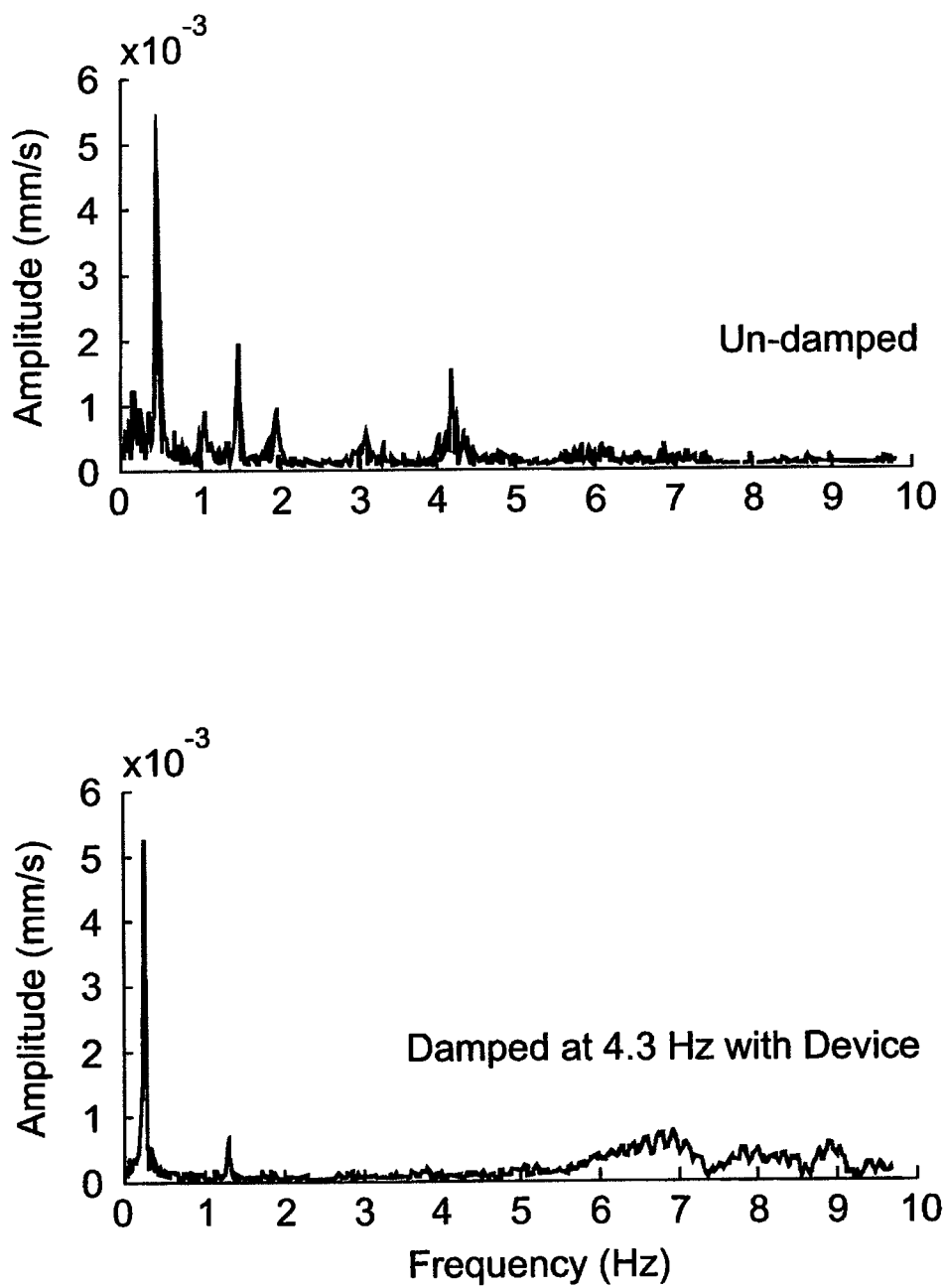
FIG. 13 shows frequency spectra for tower vibration in an undamped tower and in a tower damped according to the third embodiment.

Frequency spectra for tower vibration in an undamped tower and in a tower damped according to the third embodiment are shown in FIG. 13. The third embodiment achieves a reduction in the amplitude of the second bending mode of substantially 58%.

The invention claimed is:

1. A tower configured to support a wind turbine, the tower comprising:
   a mass assembly suspended by suspension apparatus from the top of the tower such that the mass assembly is movable to and fro in relation to the tower;
   a support assembly rigidly attached to an inside of the tower; and
   at least one coupling apparatus mechanically coupled to the mass assembly and to the support assembly, the coupling apparatus being operable to couple energy between the mass assembly and the tower as the mass assembly moves to and fro;
   the support assembly configured to provide for a change in the spring constant of the support assembly.

2. The tower according to claim 1, wherein the mass assembly is located substantially half way down the tower.

3. The tower according to claim 1, wherein the mass assembly is located generally proximate an anti-node of the tower for the second bending mode of the tower.

4. The tower according to claim 1, wherein the tower comprises a plurality of coupling apparatus spaced apart from each other inside the tower.

5. The tower according to claim 1, wherein the tower comprises a plurality of coupling apparatus, each apparatus being operative along a respective direction, the directions intersecting each other.

6. The tower according to claim 5, wherein the tower comprises at least three coupling apparatus spaced apart substantially equidistantly inside the tower.

7. The tower according to claim 1, wherein the mass assembly is suspended within the tower.

8. The tower according to claim 1, wherein the coupling apparatus comprises a biasing device configured to exert a spring bias between the mass assembly and the support structure.

9. The tower according to claim 1, wherein the coupling apparatus comprises a damping device configured to damp movement of the mass assembly in relation to the tower.

10. The tower according to claim 1, wherein the support assembly is disposed in the tower below the mass assembly.

11. The tower according to claim 1, wherein the support assembly comprises at least one tensioning device operative to change a tension between spaced apart locations on the support assembly.

12. The tower according to claim 1, wherein the support assembly comprises a plurality of tensioning devices, each operative to change a tension along a respective direction, the directions intersecting each other.

13. The tower according to claim 1, wherein the coupling apparatus comprises first and second biasing devices, which are operative in first and second opposing directions, and third and fourth biasing devices, which are operative in third and fourth opposing directions, the first and second opposing directions being substantially orthogonal to the third and fourth opposing directions.

14. The tower according to claim 1, wherein the coupling apparatus comprises first and second damping devices, which are operative in first and second opposing directions, and third and fourth damping devices, which are operative in third and fourth opposing directions, the first and second opposing directions being substantially orthogonal to the third and fourth opposing directions.

15. The tower according to claim 1, wherein the mass assembly is suspended by at least one pliable elongate member.

16. The tower according to claim 1, wherein the mass assembly is suspended by three elongate members, the three elongate members being attached to respective locations on the mass assembly, the respective locations being spaced apart from each other on the mass assembly.

17. The tower according to claim 1, wherein the mass assembly is located at least substantially 25% of a length of the tower away from the top of the tower.

18. A wind turbine apparatus comprising a tower, the tower comprising:
   a mass assembly suspended by suspension apparatus from the top of the tower such that the mass assembly is movable to and fro in relation to the tower;
   a support assembly rigidly attached to an inside of the tower; and
   at least one coupling apparatus mechanically coupled to the mass assembly and to the support assembly, the coupling apparatus being operable to couple energy between the mass assembly and the tower as the mass assembly moves to and fro;
   the support assembly configured to provide for a change in the spring constant of the support assembly.

19. The wind turbine apparatus according to claim 18, wherein the mass assembly is located at least substantially 25% of a length of the tower away from the top of the tower.

* * * * *